US006917949B1

United States Patent
Nguyen

(12) United States Patent
(10) Patent No.: US 6,917,949 B1
(45) Date of Patent: Jul. 12, 2005

(54) TEMPORARY LOBS DIRECTORY MANAGEMENT

(75) Inventor: Lynh Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 09/651,184

(22) Filed: Aug. 30, 2000

(51) Int. Cl.$^7$ .............................................. G06F 17/30
(52) U.S. Cl. .................................... 707/203; 707/104.1
(58) Field of Search .............................. 707/1–3, 9–10, 707/104.1, 200–204; 709/227; 715/511–514

(56) References Cited

U.S. PATENT DOCUMENTS

| | | | |
|---|---|---|---|
| 5,689,699 A | | 11/1997 | Howell et al. |
| 5,999,943 A | * | 12/1999 | Nori et al. ................ 707/104.1 |
| 6,061,678 A | | 5/2000 | Klein et al. |
| 6,105,017 A | | 8/2000 | Kleewein et al. |
| 6,105,043 A | | 8/2000 | Francisco et al. |
| 6,209,000 B1 | | 3/2001 | Klein et al. |
| 6,243,718 B1 | | 6/2001 | Klein et al. |
| 2001/0011276 A1 | * | 8/2001 | Durst, Jr. et al. ............. 707/10 |

FOREIGN PATENT DOCUMENTS

JP  11232305  8/1999

* cited by examiner

Primary Examiner—Mohammad Ali
(74) Attorney, Agent, or Firm—Sughrue Mion, PLLC

(57) ABSTRACT

The invention provides management of requested data files, such as large object binary files (LOBs), to maximize storage space. An interface module provides translation between a requesting application and a database containing the data files. The interface module stores requested data files in a temporary directory which is accessible by the requesting application. The interface module further generates or duplicates data file names corresponding to each data file. The data file names are sent to a clean module where the data file names are placed in a data structure. The clean module includes a timing module which generates time stamps for each data file name. The time stamps reflect the time of receipt for each data file name and are stored in association with their respective data file names. The clean module further includes a delete module which reviews the time stamps to determine if a preestablished time delay has passed. Upon passage of the time delay, the delete module generates a delete command to remove the corresponding data file from the temporary directory.

22 Claims, 4 Drawing Sheets

TEMPORARY LOBS DIRECTORY MANAGEMENT

BACKGROUND OF THE INVENTION

1. Field of the Invention

The present invention relates generally to the management of data files, such as large object binary files, for temporary access by a requesting application.

2. Relevant Technology

Databases are computerized information storage and retrieval systems. A Relational Database Management System (RDBMS) is a database system which uses relational techniques for storing and retrieving data. Relational databases are organized into tables of rows and columns of data. A database typically includes many tables, and each table includes multiple rows and columns. The tables are conventionally stored in direct access storage devices (DASD), such as magnetic or optical disk drives, for semi-permanent storage.

Users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

A common application for databases relates to their interaction with Internet web browsers. In responding to a web browser query, a table may need to be created on the web browser. This requires the transfer of data files and the formatting of a table on the web browser. As the database is responsive to SQL and a web browser requires an HTML format, an interface module is required to enable interaction between the web browser and the database. One example of such a interface module is Net.Data available from IBM Corp., Armonk, N.Y.

Net.Data enables Internet and intranet access to relational data on a variety of platforms. Net.Data incorporates a marcrolanguage which supports both HTML and SQL and allows for interaction with universal web browsers and relational database systems. Net.Data operates in conjunction with a web server interface and supports client-side processing as well as server-side processing with languages such as Java, REXX, Perl and C++. Net.Data provides database connectivity to a variety of data sources including information stored in relational databases and flat files. Net.Data may support a variety of operating systems, including OS/2, AIX, Windows NT, HP-UX, Solaris, SCO, OS/390 and OS/400. Net.Data is further able to cache web pages to improve application performance, particularly when repeated requests are made for the same web page. Although the invention is compatible for use with an interface module such as Net.Data other common gateway interface applications may be used with the present invention as well.

The interface module, which may be resident on a server, receives a query from a web browser and formats the query into SQL and interacts with the database to create the table. The interface module then uses its macrolanguage to present the table to the web browser in HTML format. The web browser, in turn, displays the table to a remote user. In this manner, the interface module serves as an Internet gateway for accessing a database.

In creating and formatting a table, the interface module retrieves files from the database for inclusion in the table. Small files, such as character values, may be passed directly from the database, converted into HTML format, and displayed on the browser. However, large files such as large object binary files (LOBs) are difficult to pass directly. A necessary feature of the interface module, such as found in Net.Data, is the ability to retrieve and incorporate LOBs into HTML format. A LOB may be a picture file, a video file, an audio file, as well as executable code. A LOB may be stored in the database and the database may extend across one or more servers. In accessing a LOB, a datalink may be used to point to actual location of the LOB.

Rather than passing LOBs directly to the web browser directly, the LOBs are stored in a temporary directory, commonly termed a "tmpblobs directory." The temporary directory is termed such because it must store LOBs for a short duration, such as for a web session. The temporary directory is a public directory which may be resident on the server side and is accessible by a web server. The web browser is only able to view files which the web server makes public to a web browser. Thus, the web browser does not have access to the database and must go through web server to access files in a public directory. A representation or link of a LOB is incorporated into the HTML document. As the table is generated on the web browser, the web server retrieves LOBs from the temporary directory.

In order to accommodate numerous web browsers, multiple applications of an interface module may be running. Each interface module may store numerous LOBs to satisfy requests from the web browsers. Given the volume of potential Internet use and the size of LOBs, a temporary directory may rapidly fill up even relatively large memory devices. Full temporary directories would no longer be accessible and would prevent the retrieval and use of additional LOBs. Furthermore, because the temporary directory is a public directory, a hacker may be able to access LOBs in the temporary directory, which are stored in the temporary directory beyond a reasonable time.

Periodic deletions of LOBs in the temporary directory are required to free up space and to reduce the opportunity for unauthorized viewing. Ideally, LOBs actively displayed on a web browser should not be deleted. Premature deletions may be avoided by shutting down the web server, but this prevents access to and use of the web site. A web site must be constantly accessible to accommodate the large number of users and to encourage its use. In some instances, shutting down a web site even momentarily may produce devastating consequences to users.

Thus, it would be an advancement in the art to provide a system and method for automatically removing LOBs to increase space in a temporary directory.

It would be a further advancement in the art to reduce the likelihood of deleting active LOBs without shutting down a web server.

Such an invention is disclosed and claimed herein.

SUMMARY OF THE INVENTION

The present invention monitors the amount of time that a LOB or other type of data file is stored in a temporary, public directory. The invention includes an interface module which is configured to store data files in the temporary directory. The data files are those requested by a requesting application such as a web browser. The interface module provides translation between the database search language and the web browser format language.

The interface module further generates or duplicates data file names corresponding to each data file. The data file names are sent to a clean module which is configured to receive the data file names. The data file names are placed in a data structure. The clean module includes a timing module for generating time stamps for each data file name. The time stamps reflect the time of receipt for each data file name and are stored in association with their respective data file names. The data file names may be stored in a time sequence.

The clean module further includes a delete module which reviews the time stamps to determine if a preestablished time delay has passed. Upon passage of the time delay, the delete module generates a delete command to remove the corresponding data file from the public directory. Only those data files processed by the interface module will be deleted.

Thus, it is an object of the invention to provide management of data files by deleting files after a reasonable amount of time has passed.

It is another object of the invention to automatically increase storage space and reduce opportunities for unauthorized viewing of data files.

It is yet another object of the invention to delete only those data files which were stored by the interface module, thereby reducing the likelihood of accidental deletions.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

A preferred embodiment of the invention is now described with reference to FIGS. 1–4, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the FIGS. 1–4, is not intended to limit the scope of the invention, as claimed, but is merely representative of presently preferred embodiments of the invention.

Various components of the invention are described herein as "modules." In one embodiment, the modules may be implemented as software, hardware, firmware, or any combination thereof. For example, as used herein, a module may include any type of computer instruction or computer executable code located within a memory device and/or transmitted as electronic signals over a system bus or network. An identified module may, for instance, have one or more physical or logical blocks of computer instructions, which may be organized as an object, procedure, function, or the like.

Nevertheless, the identified modules need not be located together, but may include disparate instructions stored in different locations, which together implement the described functionality of the module. Indeed, a module may have a single instruction, or many instructions, and may even be distributed over several different code segments, among different programs, and across several memory devices.

As used herein, the term executable code, or merely "executable," is intended to include any type of computer instruction and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
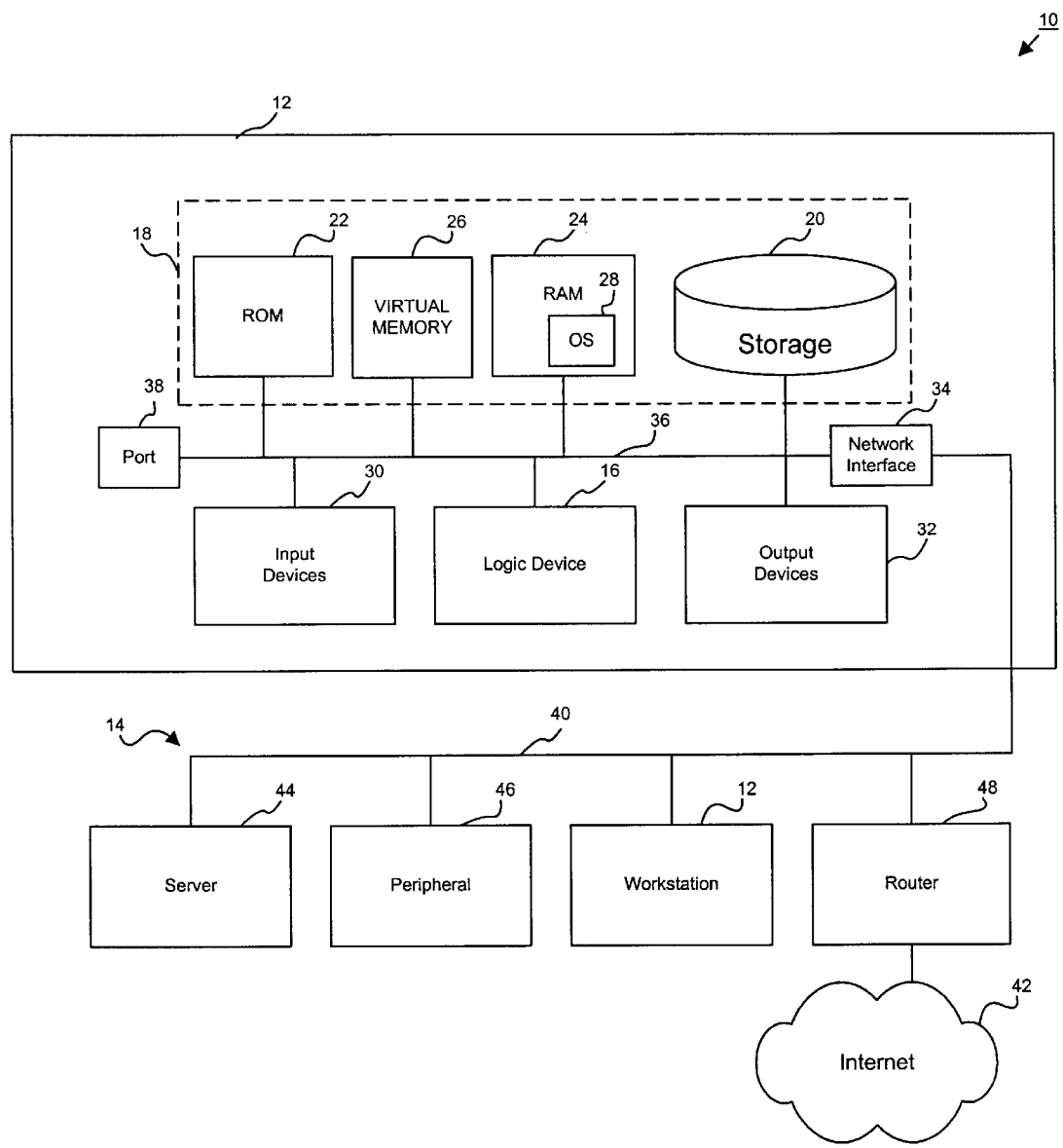
FIG. 1 is a schematic block diagram of a computer system suitable for implementing one embodiment of the invention.

FIG. 1 is a schematic block diagram illustrating a computer system 10 in which a plurality of modules may be hosted on one or more computer workstations 12 in a network 14. The network 14 may comprise a wide area network (WAN) or local area network (LAN) and may also comprise an interconnected system of networks, one particular example of which is the Internet.

A typical computer workstation 12 may include a logic device 16 and may be embodied as a central processing unit (CPU), microprocessor, a general purpose programmable device, application specific hardware, a state machine, or other processing machine. The logic device 16 may be operably connected to one or more memory devices 18. The memory devices 18 are depicted as including a non-volatile storage device 20, such as a hard disk drive, CD-ROM drive, tape drive, or any other suitable storage device. The memory devices 18 may further include a read-only memory (ROM) 22, and a random access volatile memory (RAM) 24. The RAM 24 may be used to store instructions by the logic device 16 during execution. The memory devices 18 may further include a virtual memory 26 which, in one embodiment, is a portion of the non-volatile storage 20 which is used to extend the RAM 24.

Preferably, the computer workstation 12 operates under the control of an operating system (OS) 28, such as OS/2, WINDOWS NT, WINDOWS 98, UNIX, or the like. In one embodiment, the operating system 28 may be loaded from the storage 20 into the RAM 24 at the time the workstation 12 is booted.

The computer workstation 12 may also include one or more input devices 30, such as a mouse or keyboard, for receiving inputs from a user. Similarly, one or more output devices 32, such as a monitor or printer, may be provided within, or be accessible from, the workstation 12.

A network interface 34, such as an Ethernet card, may be provided for coupling the workstation 12 to other devices via the network 14. Where the network 14 is remote from the computer workstation 12, the network interface 30 may comprise a modem, and may connect to the network 14 through a local access line, such as a telephone line.

Within any given workstation 12, a system bus 36 may operably interconnect the logic device 16, the memory devices 18, the input devices 30, the output devices 32, the network interface 34, and one or more additional ports 38, such as parallel ports and RS-232 serial ports.

The system bus 36 and a network backbone 40 may be regarded as data carriers. Accordingly, the system bus 36 and the network backbone 40 may be embodied in numerous configurations. For instance, the system bus 36 and the network backbone 40 may comprise wire and/or fiber optic lines, as well as "wireless" electromagnetic links using visible light, infrared, and radio frequencies.

In general, the network 14 may comprise a single local area network (LAN), a wide area network (WAN), several adjoining networks, an intranet, or as in the manner depicted, a system of interconnected networks such as the Internet 42. The individual workstations 12 may communicate with each other over the backbone 40 and/or over the Internet 42 using various communication techniques. Thus, a communication link may exist, in general, between any of the stations 12.

Different communication protocols, e.g., ISO/OSI, IPX, TCP/IP, may be used within the network 14, but in the case of the Internet 42, a single, layered communications protocol (TCP/IP) generally enables communications between the differing networks 14 and workstations 12.

The workstations 12 may be coupled via the network 14 to application servers 44, and/or other resources or peripherals 46, such as printers, scanners, and facsimile machines. External networks may be coupled to the network 14 through a router 48 and/or through the Internet 42.

Figure 2:
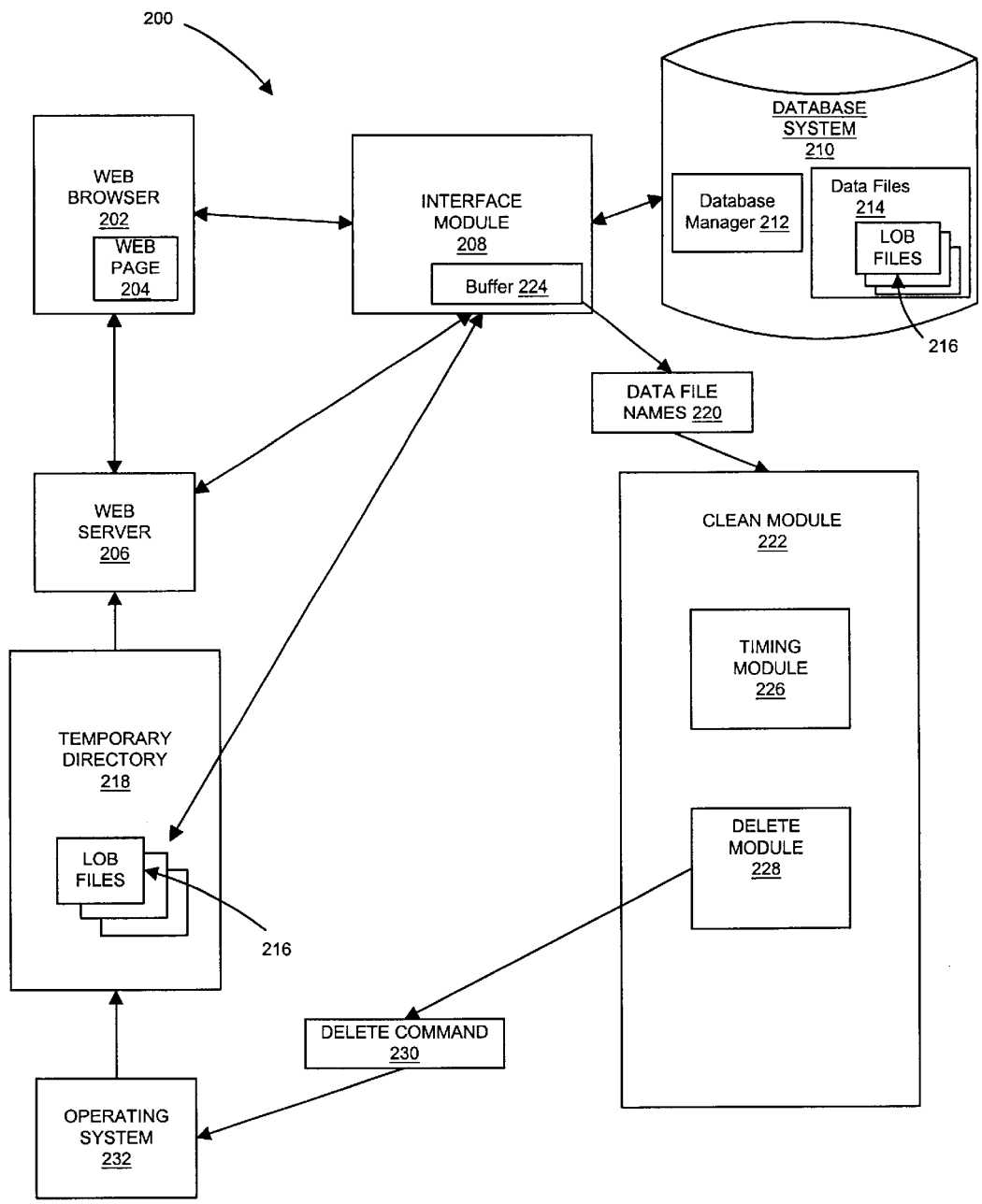
FIG. 2 is a schematic block diagram of one embodiment of a system of the present invention.

Referring now to FIG. 2, a temporary data file management system 200 of the present invention is shown. The system 200 preferably includes a plurality of modules containing executable code and operational data suitable for operation within the memory devices 18 of FIG. 1. Of course, the memory devices 18 in which the modules of the present invention are located may also be distributed across both local and remote computer workstations 12. Likewise, two or more illustrated modules may be integrated into a single module without departing from the scope of the invention.

The present invention may be used over the Internet 42 and in conjunction with a conventional web browser 202. The web browser 202 interprets HTML documents and formats and defines web pages 204. The web browser 202 may be at a remote workstation 12 and may be connected through the Internet 42 to a web server 206. The web server 206 stores HTML documents and interacts with the web browser 202 for downloading and uploading the documents for generation of web pages 204.

In operation, a user located at a remote site operates the web browser 202 to send a request. This request is sent across the Internet 42 to the web server 206, where the request is interpreted by the web server 206. Where a request is for data files stored in a database, the request must be interpreted into a SQL command. An SQL command request is sent to an interface module 208 which reads the request and formats it into a SQL command. Both the web server 206 and the interface module 208 may be resident on the server side.

The interface module 208 is configured to be compatible with HTML as well as SQL transactions and commands. In one embodiment, the interface module 208 may be Net.Data, but one of skill in the art will appreciate that other computer gateway interfaces capable of supporting and interfacing HTML formats and SQL commands may be used as well. The interface module 208 sends the request as a SQL command to a database system 210. In one embodiment, the database system 210 system may be a relational database, but hierarchical and object oriented databases are also within the scope of the invention. In embodiments were databases other than relational databases are used, the interface module 208 is configured to be compatible with such databases in a supporting transaction and command language.

A database manager 212, such as DB2 manufactured by International Business Machines, receives the SQL command and searches in the database 210 to retrieve data files 214 that satisfy the request. Data files 214 may include any number of various files stored in a database 210 including text, values, characters, integers, and LOBs. Once the data files are retrieved, the database manager 212 passes the retrieved data files to the interface module 208. The interface module 208 may directly pass relatively small data files 214 in an HTML format to the web browser 202. This feature is performed by the Net.Data application and expedites retrieval of data files 214 and generation of the web page 204. The web browser 202 then includes the small data files 214 in a generated web page 204.

Alternatively, the interface module 208 may pass the small data files 214 to the web server 206 for inclusion in an HTML document. The web server 206 then transmits the data files 214 to the web browser 202.

If the interface module 208 receives one or more LOBs 216, the LOBs 216 are sent to a temporary directory 218. This is because LOBs 216 are typically too large to pass directly to a web browser 202. The temporary directory 218 is a public directory in that it is accessible by the web server 206. In an HTML document generated by the web server 206, a link is established to the appropriate LOB 216 in the temporary document 218. The web server 206 uses the link to create the LOB 216 on the web page 204 as required. In this manner, the web browser 202 is able to display a web page 204 having relatively small data files 214 as well as LOBs 216.

By way of example, a remote user may request a table from the database system 210. The table may include data files 214 containing numerical values as well as a LOB 216 picture file, such as in a GIF or JPEG format. The table may be generated on the web page 204 with a row containing values and a LOB 216 picture. The system 200 would display the data files 214 parsed in appropriate columns by directly passing the values and storing the LOB 216 in a temporary directory 218.

The interface module 208 is further configured to transmit the file names 220 of LOBs 216 to a clean module 222. The file names 220 correspond to the name of the LOBs 216. The interface module 208 need not wait until a browser session is closed before sending the file name 220 to the clean module 222. In one embodiment, the interface module 208 temporarily stores the file names 220 in a buffer 224. At the end of a transaction with the database system 210, the file names 220 in the buffer 224 are sent to the clean module 222. The interface module 208 may contact the clean module 222 through a port number and a socket configured to transfer data.

The clean module 222 assists in removing files and, in particular, LOBs 216 stored in the temporary directory 218. The clean module 222 may be embodied as a daemon which is launched automatically on the web server 206 site and is further configured to run in the background. The clean module 222 has a timing module 226 configured to establish an entry time for each file name 220. The clean module 222 further includes a delete module 228 configured to review each the entry time of each file name 220 and determine if sufficient time has passed to delete the corresponding LOB 216. If sufficient time has passed, the delete module 228 sends a delete command 230 to an operating system 232 to delete the LOB 216 corresponding to the file name 220. The operating system 232 receives the command 230, accesses the temporary directory 218, and deletes the appropriate LOB 216.

Figure 3:
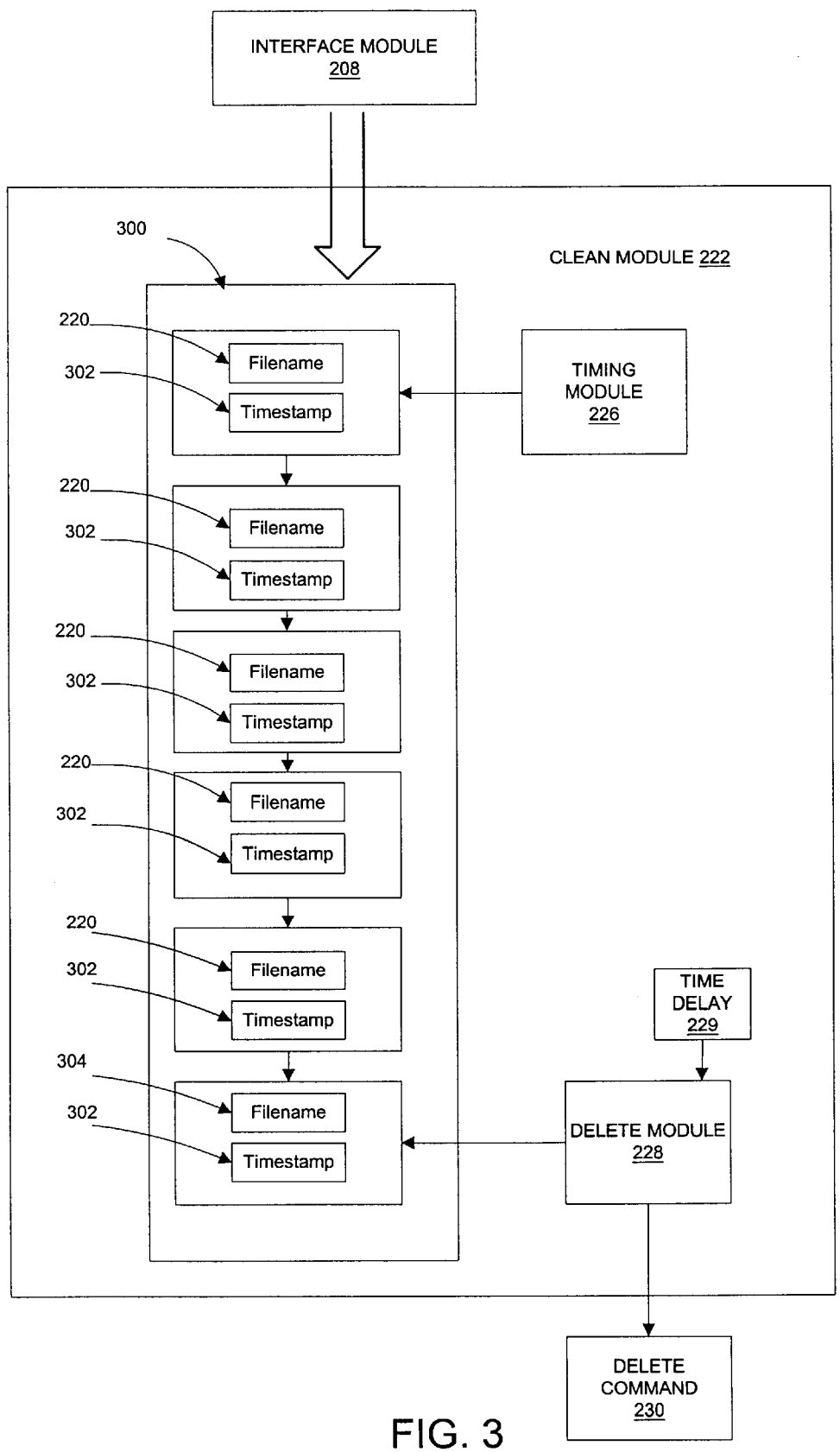
FIG. 3 is a schematic block diagram of the clean module in the embodiment of FIG. 2.

Referring to FIG. 3, a block diagram of the clean module 222 is shown. As previously discussed, the interface module 208 sends the file name 220 of the LOB 216 to the clean module 222. The invention is contemplated for use with several interface modules 208 as may be required to support Internet access and use of the database system 210. Thus, there may be several interface modules 208 sending file names 220 to a clean module 222. A management system 200 may further incorporate a plurality of clean modules 222 as required to support the number of interface modules 208. The interface module 208 loads the file name 220 into a data structure 300 within the clean module 222 such as a linked list 300.

Once the file name 220 is placed in the linked list 300, the timing module 226 generates and assigns a time stamp 302 to each file name 220. This may be done individually for each incoming file name 220 or it may be done collectively as a buffer 224 containing file names 220 is received. The time stamp 302 is a reflection of the entry time of a file name 220. A time stamp 302 is stored in association with each file name 220.

The file names 220 may be stored in the linked list 300 in time sequence. As such, the delete module 228 periodically reviews the oldest file name 304 in the linked list 300. The delete module 228 compares the time stamp 302 of the oldest file name 304 to the existing time to determine how much time has passed since entry of the file name 304.

A time delay 229, indicating a certain increment of time, is preestablished by a user or by the system 200 and stored in the clean module 222. The time delay serves in determining the approximate time that must pass before a LOB 216 will be deleted. The time delay 229 may be adjusted by a user or by the system 200 as needed. The delete module 228 compares the time that has passed to the time delay 229 to determine if sufficient time has passed. The time delay 229 may be set to allow for a reasonable amount of time for a browsing session. This reduces the likelihood of a premature deletion of the LOB 216. In some instances, the browsing session may exceed the time delay which would eliminate the LOB 216 from the web page 204 and require a reloading of the web page 204. Nevertheless, the advantages gained in freeing storage in the temporary directory 218 and reduction in hacker risks outweighs the occasional inconvenience of reloading.

If sufficient time has passed, the delete module 228 generates and sends the delete command 230 to the operating system 232. The delete module 228 further deletes the file name 304 and its corresponding time stamp 302 within the clean module 222. The delete module 228 then reviews the next file name 220 in the linked list which will now be the oldest file name 304 if the file names 220 are stored in time sequence.

An advantage of the invention is that the clean module 222 only deletes LOBs 216 sent to the temporary directory 218 by the interface module 208. Thus, other files in the temporary directory 218 not sent by the interface module 208 will are not deleted by intervention of the clean module 222. This reduces the risk of accidental deletion by the clean module 222.

Figure 4:
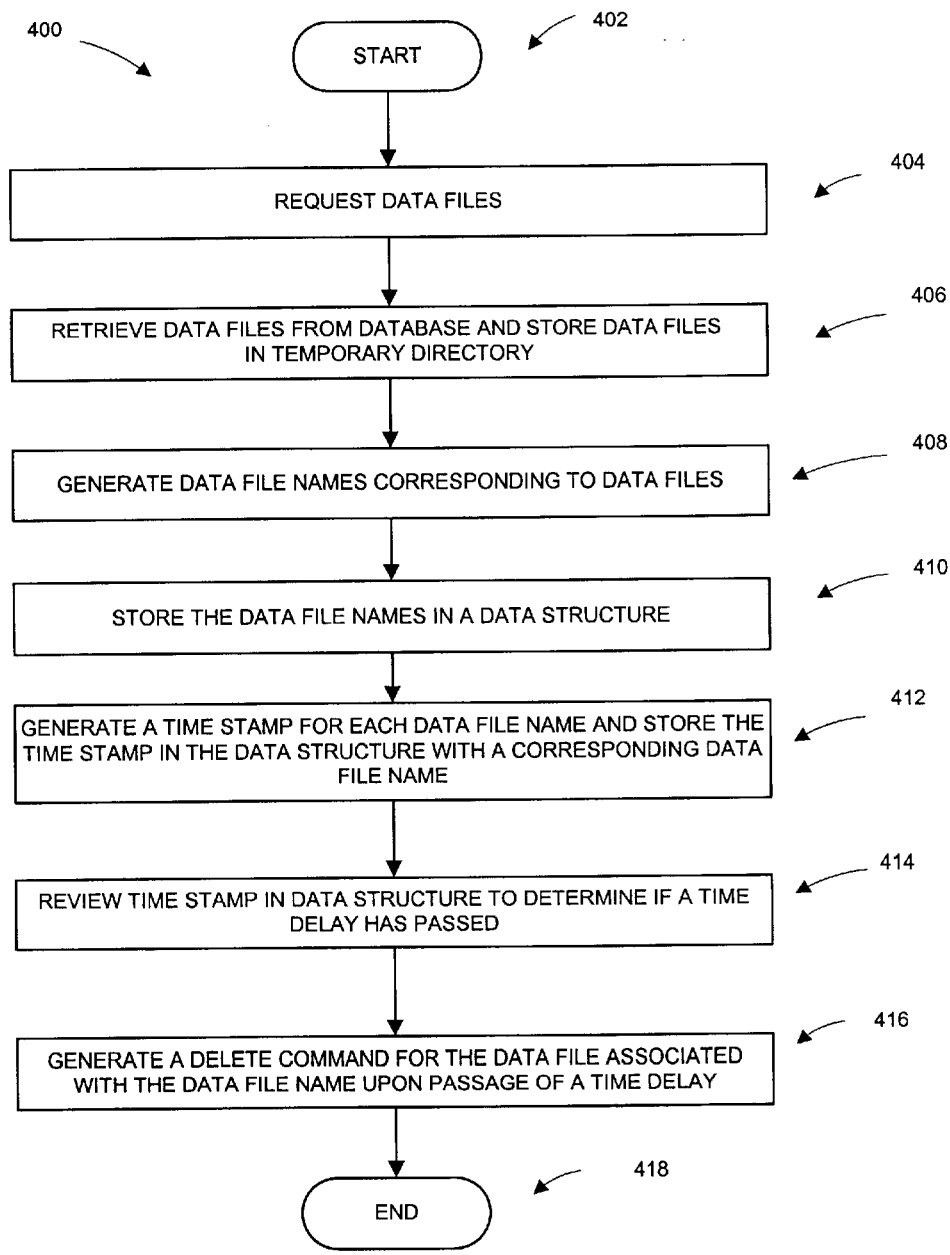
FIG. 4 is a flow diagram illustrating steps performed in one embodiment of the present invention.

Referring to FIG. 4, a flow diagram 400 incorporates one embodiment of a method of use of the system 200 of FIG. 2. In step 402, the method begins. A requesting application, such as the web browser 202 requests 404 one or more data files 214. The data files 214 are stored in the database system 210 and may include text, characters, integers, values, as well as LOBs 216 such as graphics, audio, video data files. The request may be sent over the Internet 42 to the interface module 208 which translates the request into a suitable search command such as SQL.

The database system 210 retrieves 406 data files 214 satisfying the request. The interface module 208 may directly pass relatively small data files 214 to the web browser 202 for incorporation into a web page 204. LOBs 216, on the other hand, are stored by the interface module 208 in the temporary directory 218.

The interface module 208 generates 408 data file names 220 corresponding to LOBs 216 stored in the temporary directory 218. The data file names 220 may be temporarily stored in a buffer 224.

The interface module 208 sends 410 the file names 220 to the clean module 222 where the file names 220 are stored 410 in a data structure 300.

The clean module 222 generates 412 a time stamp 302 for each file name 220. The time stamp 302 reflects the approximate entry time of the file name 220 into the clean module 222. The time stamp 302 is stored in association with each file name 220.

The clean module 222 reviews 414 each time stamp 302 and determines how much time has passed since the corresponding file name 220 was stored in the data structure 302. The storage time of a file name 220 is then compared to a preestablished time delay to determine if sufficient time has passed. If sufficient time has not yet passed, the clean module 222 continues to periodically review the time stamp 302. If sufficient time has passed, the process continues to step 416.

In one embodiment, the file names 220 may be stored in time sequence. In such an embodiment, the clean module 222 would first review the time stamp 302 of the oldest file name 220.

The clean module 222 generates 416 a command 230 to delete the LOB 216 associated with corresponding data file name 220. In step 418, the method terminates.

The invention provides a system and method for increasing storage space in a public directory 218 by deleting LOBs 216 after a certain amount of time. Storage space may be quickly depleted in an Internet environment where numerous requests for LOBs 216 are constantly made. The invention ensures that the LOBs 216 will be available for a reasonable amount of time, after which time the LOBs 216 are efficiently deleted. Files which were not stored in the public directory 218 by the interface module 208 will not be deleted inadvertently. The invention operates automatically, that is, without user intervention, to keep storage to manageable levels. The invention may be readily adapted to existing software applications such as web browsers, web servers, database management systems, operating systems and other modules disclosed herein.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for managing data files retrieved from a database system and stored in a temporary directory for use by a requesting application, the method comprising:

generating data file names corresponding to data files stored in the temporary directory;

storing the data file names in a data structure;

generating time stamps corresponding to the data file names and storing the time stamps in the data structure;

reviewing the time stamps to determine if a predetermined time delay has passed; and generating commands to remove data files from the temporary directory upon passage of the time delay.

2. The method of claim 1, further comprising retrieving the data files from the database responsive to commands from the requesting application.

3. The method of claim 2, further comprising converting the commands to a structured query language format to support interfacing with the database.

4. The method of claim 1, further comprising inserting data files into an HTML format to support interfacing between the requesting application and the database.

5. The method of claim 1, wherein the data files are large object binary files.

6. The method of claim 1, wherein the data structure is a linked list and further comprising storing the data file names in a time sequence.

7. The method of claim 1, further comprising sending the command to an operating system to effect removal of the data file from the temporary directory.

8. A computer readable medium having stored thereon computer executable instructions for performing a method for managing data files retrieved from a database and stored in a temporary directory for use by a requesting application, the method comprising:

generating data file names corresponding to data files stored in the temporary directory;

storing the data file names in a data structure;

generating time stamps corresponding to the data file names and storing the time stamps in the data structure;

reviewing the time stamps to determine if a predetermined time delay has passed; and generating commands to remove data files from the temporary directory upon passage of the time delay.

9. The computer readable medium of claim 8, wherein the method further comprises retrieving the data files from the database responsive to commands from the requesting application.

10. The computer readable medium of claim 9, wherein the method further comprises converting the commands to a structured query language format to support interfacing with the database.

11. The computer readable medium of claim 8, wherein the method further comprises inserting data files into an HTML format to support interfacing between the requesting application and the database.

12. The computer readable medium of claim 11, wherein the data files are large object binary files.

13. The computer readable medium of claim 8, wherein the data structure is a linked list and wherein the method further comprises storing the data file names in time sequence.

14. The computer readable medium of claim 8, wherein the method further comprises sending the command to an operating system to effect removal of the data file from the temporary directory.

15. A system for managing data files retrieved from a database and stored in a temporary directory for use by a requesting application, the system comprising:

an interface module configured to store the data files in the temporary directory and generate data file names corresponding to each data file; and a clean module configured to receive the data file names from the interface module and place the data file names in a data structure, and having a timing module configured to generate time stamps corresponding to each data file name, and reflecting the time of receipt for each data file name, and a delete module configured to review the time stamps and, upon passage of a predetermined time delay, generate a delete command to remove the data file from the temporary directory.

16. The system of claim 15, wherein the interface application module is configured to support structured query language and provide interfacing between the requesting application and the database.

17. The system of claim 16, wherein the interface application retrieves the data files from the database responsive to commands from the requesting application.

18. The system of claim 15, wherein the data files are large object binary files.

19. The system of claim 15, wherein the data structure is a linked list and the data file names are stored in time sequence.

20. The system of claim 15, wherein the delete module sends the delete command to an operating system which effects removal of the data file from the temporary directory.

21. The system of claim 15, further comprising a plurality of interface modules configured to store data files in the temporary directory and generate data file names, wherein the clean module receives the data file names corresponding to each data file from the interface modules.

22. The system of claim 15, wherein the interface application module is configured to support HTML and provide interfacing between the requesting application and the database.

* * * * *